(12) United States Patent
Toomey et al.

(10) Patent No.: US 7,839,861 B2
(45) Date of Patent: Nov. 23, 2010

(54) METHOD AND APPARATUS FOR CALCULATING BANDWIDTH REQUIREMENTS

(75) Inventors: Fergal Toomey, Killiney (IE); Ian Edward Dowse, Dun Laoghaire (IE); Matthew Charles Davey, Dublin (IE)

(73) Assignee: Corvil Limited, Dublin (IE)

( * ) Notice: Subject to any disclaimer, the term of this patent is extended or adjusted under 35 U.S.C. 154(b) by 471 days.

(21) Appl. No.: 11/722,696

(22) PCT Filed: Dec. 23, 2004

(86) PCT No.: PCT/IE2004/000176

§ 371 (c)(1),
(2), (4) Date: Jun. 22, 2007

(87) PCT Pub. No.: WO2006/067769

PCT Pub. Date: Jun. 29, 2006

(65) Prior Publication Data

US 2008/0043745 A1    Feb. 21, 2008

(51) Int. Cl.
*H04L 12/28* (2006.01)
(52) U.S. Cl. ............... 370/395.21; 370/395.71; 370/412
(58) Field of Classification Search ............ 379/114.07
See application file for complete search history.

(56) References Cited

U.S. PATENT DOCUMENTS

| 7,388,867 | B2 * | 6/2008 | Bjoerkman et al. | .... 370/395.21 |
| 2002/0163887 | A1 * | 11/2002 | Suni | ...................... 370/232 |
| 2004/0136379 | A1 * | 7/2004 | Liao et al. | ............. 370/395.21 |

OTHER PUBLICATIONS

Liebherr, j. "A note on statistical multiplexing and scheduling in video networks at high data rates", online Jan. 8, 2002, p. 1-15, XP002347890.*
Liebherr, J. "A Note on Statistical Multiplexing and Scheduling in Video Networks at High Data Rates" 'Online! Jan. 8, 2002, pp. 1-15, XP002347890 Charlottesville Retrieved from the Internet: URL:http://www.cs.virginia.edu/{jorg/archive/papers/scalable.pdf> 'retrieved on Oct. 4, 2005! abstract *Section 2.1 Traffic Arrivals and Envelope Functions on pp. 5-6*.

* cited by examiner

*Primary Examiner*—Chi H Pham
*Assistant Examiner*—Kouroush Mohebbi
(74) *Attorney, Agent, or Firm*—Schwabe, Williamson & Wyatt, P.C.

(57) ABSTRACT

Embodiments of the invention relates to bandwidth requirements within a packet data network. A method and system for analysing traffic is described herein. The method may utilises an estimation of a concave hull function of the arrived traffic within the buffer. The use of such a concave hull representation may allows for more efficient data processing and for a direct measurement of desired service rates for differing predetermined control parameters.

30 Claims, 6 Drawing Sheets

METHOD AND APPARATUS FOR CALCULATING BANDWIDTH REQUIREMENTS

FIELD OF THE INVENTION

Embodiments of the present invention relate to communication networks and specifically to a packet based data communication network. They more particularly relate to a method of estimating the bandwidth required to assure a specified quality of service for the transmission of packets of data through a switch node comprising a buffer having a defined size.

BACKGROUND

A communication network is a collection of network elements interconnected so as to support the transfer of information from a user at one network node to a user at another. The principal network elements are links and switches. A link transfers a stream of bits from one end to another at a specified rate with a given bit error rate and a fixed propagation time. The rate at which a buffer is served is the service capacity, measured in bits per second. Other common terms for service capacity are link-rate and bandwidth. Links are unidirectional. Important links are:

optical fibre;
copper coaxial cable;
microwave wireless.

Several incoming and outgoing links meet at a switch, a device that transfers bits from its incoming links to its outgoing links. The name "switch" is used in telephony, while in computer communications, the device that performs routing is called a "router"; the terms are used interchangeably in this specification. When the rate of incoming bits exceeds that of outgoing bits, the excess bits are queued in a buffer at the switch. The receiver of each incoming link writes a packet of bits into its input buffer; the transmitter of each outgoing link reads from its output buffer. The switch transports packets from an input buffer to the appropriate output buffer. A schematic example of such a network arrangement is shown in FIG. 1 where a router 100, including one or more input buffers 110 and one or more output buffers 120, is used to couple a corresponding number of incoming links 130 with outgoing links 140.

The quality of a communications network service, as perceived by a user, varies greatly with the state of the network. To make packet-switched networks economically viable, it is necessary to be able to guarantee quality while reducing capital investment and operating expenses.

Degradation in the perceived quality of a service can often be traced back to loss or delay of data packets at a node or switch in the network. User satisfaction can be guaranteed by managing loss and delay of packets at those nodes where congestion can occur.

Typically, users transmit bits in bursts: active periods are interspersed with periods of inactivity. The peak rate of transmission cannot exceed the link rate. The mean rate of transmission, by definition, cannot exceed the peak rate. The ratio:

$$\frac{\text{(peak rate)} - \text{(mean rate)}}{\text{(mean rate)}}$$

is a measure of what is called the burstiness of the source.

Loss and delay of data packets at a node in the network arise from the queuing of packets in the buffers of switches or routers. Buffers are required to cope with fluctuations in the bit-rate on incoming links. However, if the buffers are too small, packets will be lost as a result of buffer overflow; if the buffers are too large, some packets will experience unacceptable delays. For a given buffer-size, loss and delay can be reduced by increasing the capacity of the outgoing link.

To eliminate packet loss entirely, it would be necessary to increase the capacity of the outgoing link to equal the sum of the capacities of the incoming links. This is prohibitively expensive. Nevertheless, it is a strategy employed sometimes by network operators who take a conservative view on assuring network quality of service.

Another known technique is based on an understanding that it is unnecessary to eliminate packet loss and unacceptable packet delay in order to give satisfactory perceived quality. It is enough to keep their frequency within predetermined bounds. These bounds are referred to as Quality of Service (QoS) targets.

The optimal way to ensure satisfactory perceived quality is to provide the minimum capacity that will guarantee the QoS targets. This minimum capacity is referred to as the Bandwidth Requirement (BWR) of the bit-stream. It lies somewhere between the mean rate and the peak-rate requirement.

The existence of a BWR and its value can be demonstrated experimentally with a router by observing the change in the frequency with which a target queuing delay in an output buffer is exceeded when the capacity of the outgoing link is varied.

The mean-rate and the peak-rate do not depend on the QoS targets. For bursty traffic, the peak-rate can be many multiples of the mean-rate. As the QoS target changes, the BWR varies between the mean and the peak rates.

For a given QoS target, the BWR depends strongly on the nature of the traffic. There is no universal multiplier than can be applied to the mean-rate or peak-rate to give the BWR for a given QoS target. The fundamental problem in providing quality of service in a data network is to determine accurately the minimum service rate at which packets of data may be removed from a buffer in a switch whilst maintaining quality of service in the data network and optimising the available bandwidth in the network. Accurate estimation of the BWR opens the way for many applications: monitoring network quality levels, QoS-sensitive service provisioning, IP call admission control, traffic-based billing and capacity planning.

A well known approach to estimating the BWR is through traffic modelling. Such an approach consists of first, choosing a statistical model of the traffic; second, fitting the parameters of the model to the traffic; third, performing a mathematical analysis of the model to determine its queuing properties and hence its bandwidth requirement. Such methods often use what is termed an effective bandwidth analysis. Examples of these known techniques are given in "*Effective bandwidths for multiclass Markov fluids and other ATM sources*," George Kesidis, Jean Walrand and Cheng-Shang Chang, IEEE/ACM Tran. Networking, Vol. 1, pp. 424-428, 1993, "*Effective bandwidth estimation and testing for Markov sources*", J Pechiar, G Perera, M Simon, Performance Evaluation archive, Volume 48, Issue 1-4 (May 2002), pp 157-175 and "*Traffic characterisation and effective bandwidths for broadband network traces*", R. J. Gibbens, in: F. P. Kelly, S. Zachary, I. B. Ziedins (Eds.), Stochastic Networks: Theory and Applications, Oxford University Press, Oxford, 1996, pp. 1-11.

Each of these steps is fraught, particularly the first and third. Choosing a good model is difficult: network traffic is very complex in behaviour and simple statistical models do not suffice to describe it. However, the more sophisticated the model, the more difficult it is to analyse; realistic traffic models are generally intractable. It will be appreciated also that the more sophisticated the model, the higher the computational requirement within the computer that is used to analyse and monitor the traffic flow.

This approach requires the exercise to be repeated for each new source of traffic. Furthermore, the whole procedure is limited to traffic that is stable in behaviour over the lifetime of the exercise—at least weeks—and therefore completely precludes a dynamic on-line implementation.

Practical methods of estimating the BWR typically rely on making certain statistical assumptions about the traffic flow. One such method has been described in the U.S. Pat. No. 6,580,691 (Bjoerkman et al), namely a polygonal approximation to a scaled cumulant generating function (sCGF). This US patent Specification discloses a method and system for estimating the sCGF on-line in real time and using it to estimate the BWR. The statistical assumptions made by the sCGF method assume a particular relationship between a quality target (such as a packet delay) and the frequency with which that target is exceeded: for example, it is assumed that the probability of a delay target being exceeded becomes smaller exponentially as that delay target increases. This relationship is exploited in the production of a compact traffic descriptor. The assumption is well founded but is not always accurate across the whole range of relevant quality targets. For example, at small delay targets, the probability of exceeding a delay target is governed by the time taken to serialise the data onto the link; at long delay targets or low probabilities there will be insufficient data to produce reliable statistics.

It will be appreciated that the most accurate method of determining the BWR is to record the precise details of the traffic flow and then to simulate the passage of the traffic flow through a switch, varying the simulated service rate until the QoS targets are precisely satisfied. This method is however computationally expensive and impractical to deploy.

SUMMARY

A first embodiment of the invention may provide a method of estimating the bandwidth requirement (BWR) of a traffic flow at a specified quality of service for the transmission of data through a switch having a defined buffering capacity and fixed service rate. The BWR estimation of the present invention may be accurate and computationally efficient. It may also be advantageous in that no assumptions about the statistics of the traffic flow are required.

According to an embodiment of the invention, a method of analysing traffic at least one node in a packet data network is provided, the method comprising:
 monitoring the volume of traffic passing the node over time so as to determine an arrivals process for that node,
 using the determined arrivals process to define a first data set, the first data set being a concave hull function representative of the arrivals process, and
 using the first data set as an analysis of the traffic.

The size of this first data set may be smaller than that of the arrivals process on which it is based. It may be understood therefore that by using this first data set as the analysis tool for the analysis of the traffic it may be possible to perform calculations based on the traffic more efficiently and at smaller intervals.

The node may be a buffer in the network, and the first data set may be used to calculate the delay experienced by packets traversing the buffer for a supplied service rate, the service rate determining the rate at which traffic arriving in the buffer is to be removed from the buffer. The supplied service rate may be represented as a tangent to the concave hull of the arrivals, and the delay experienced by the arriving packet may be defined by the point of intersection of the tangent with the x-axis.

Alternatively, the first data set may be used to calculate the volume of queued bytes in the buffer after the arrival of a packet, for a supplied service rate. In such embodiments, the supplied service rate may be represented as a tangent to the concave hull of the arrivals, and the volume of queued bytes in the buffer after the arrival of a packet may be defined by the point of intersection of the tangent with the y-axis.

A further embodiment of the invention may use the first data set to calculate the service rate required to ensure an arriving packet at the node is delayed by no more than a supplied delay. In such an embodiment, the supplied delay may be represented as a point on the x-axis and the required service rate may be defined as the tangent to the concave hull of the arrivals that passes through that point on the x-axis.

Another embodiment may use the first data set to calculate the service rate required to ensure that the buffered volume is no more than a supplied volume after the arrival of a packet. In such an embodiment, the supplied volume may be represented as a point on the y-axis and the required service rate may be defined as the tangent to the concave hull of the arrivals that passes through that point on the y-axis.

It will be appreciated that the first data set may be dynamically modified by the arrival of additional data within the buffer. Such dynamic modification may be possible as a result of the smaller processing required for this data set than was heretofore possible.

Where the node is provided as a buffer, the buffer may be provided having a finite size and if the traffic defining the arrivals process is such so as to overflow that finite size buffer, the method may include:
 using the determined arrivals process to define a second data set, the second data set being a set of convex hull functions representative of the arrivals process from the current time to each concave hull point, and
 using a combination of the first data set and second data set as an analysis of the traffic.

The method may then include using the first data set to calculate the service rate required to ensure that the buffered volume is no more than a supplied volume after the arrival of a packet so as to determine a minimum service rate sufficient to ensure the buffered volume does not exceed a maximum allowed volume, and using the second data set to define a maximum service rate such that the buffered volume at the current time is larger than at any other time since the time represented by a particular concave hull point.

The use of the combination of the first and second data set may include a comparison of service rates for both the first and second data sets, and the method may include selecting the lesser of the two service rates as the service rate for servicing the traffic at the node, this lesser service rate being sufficient to ensure that the arriving packet is not lost.

In some embodiments, a plurality of convex hulls may be defined for the arrivals process, each of the convex hulls being provided between adjacent points on the concave hull of the arrivals process.

The method may include equating a maximum allowed buffered volume to an equivalent maximum allowed number of packets, the equating being effected by determining an average number of bytes in each packet.

Alternatively, the method may include equating a maximum allowed buffered volume to an equivalent maximum allowed number of packets, the equating being effected by performing an exact mapping for a determined number of packets to the volume occupied by those packets.

Embodiments of the invention may also provide a method of providing at least one traffic descriptor for traffic in a network, the method comprising analysing the traffic in accordance with that heretofore described and using the analysis of the traffic to define a relationship between service rate of that traffic and the quality of service required for the network.

One or more traffic descriptors may be provided in accordance with the invention, the plurality of traffic descriptors providing an historical analysis descriptor of the traffic in the network.

Such traffic descriptors may be utilised as the input to further network performance analysis.

Various embodiments also provide a traffic analyser for use in a packet data network, the analyser including:
- a volume monitor, the volume monitor being adapted to monitor the volume of traffic passing a node in the packet data network over time;
- a volume analyser, the volume analyser being adapted to interface with the output of the volume monitor so as a to provide an arrivals process for that node, the arrivals process being defined by a first number of data points;
- a first processor adapted to process the arrivals process so as to define a concave hull function representative of the arrivals process; the concave hull function being defined by a second number of data points, the second number being less than the first number, and wherein the concave hull function may be used as an analysis parameter of the traffic in the packet data network.

Such a traffic analyser may further include a delay calculator, the delay calculator being adapted to use the concave hull function to calculate the delay experienced by packets traversing the node.

It may also or alternatively include a volume calculator, the volume calculator being adapted to use the concave hull function to calculate the volume of queued bytes at the node after the arrival of a packet, for a supplied service rate.

Yet a further possible addition to the traffic analyser is a service rate calculator. The service rate calculator may be adapted to use the concave hull function to calculate a required service rate sufficient to ensure that an arriving packet at the node is delayed by no more than a supplied delay or to use the concave hull function to calculate a required service rate sufficient to ensure that a buffered volume at the node is no more than a supplied volume, subsequent to the arrival of a packet at the node.

The processor may be adapted to dynamically update the concave hull function, the update being effected on a change of the arrivals process for that node.

The traffic analyser may further include a second processor, the second processor being adapted to process the arrivals process so as to define a convex hull function representative of the arrivals process; the concave hull function being defined by a third number of data points, the third number being less than the first number.

The concave hull function and the convex hull function in such an embodiment respectively may define a minimum service rate sufficient to ensure that a buffered volume at the node does not exceed a maximum allowed buffered volume and a maximum service rate sufficient to ensure that a buffered volume at the node at a particular instant is larger than at any other time since the time represented by a particular concave hull point, and the analyser may include a comparator adapted to compare the two defined service rates and to choose the lesser of the two service rates as the service rate for servicing the traffic at the node.

The analysers, calculators and processors of the traffic analyser may, it will be appreciated, be provided in software, hardware or a combination of both. Embodiments of the invention may also provide computer software and a computer readable medium having programming means embodied thereon and adapted to carry out the method of the invention.

BRIEF DESCRIPTION OF THE DRAWINGS

Exemplary embodiments of the present invention may be described with reference to the accompanying drawings in which.

DETAILED DESCRIPTION OF THE DRAWINGS

Figure 1:
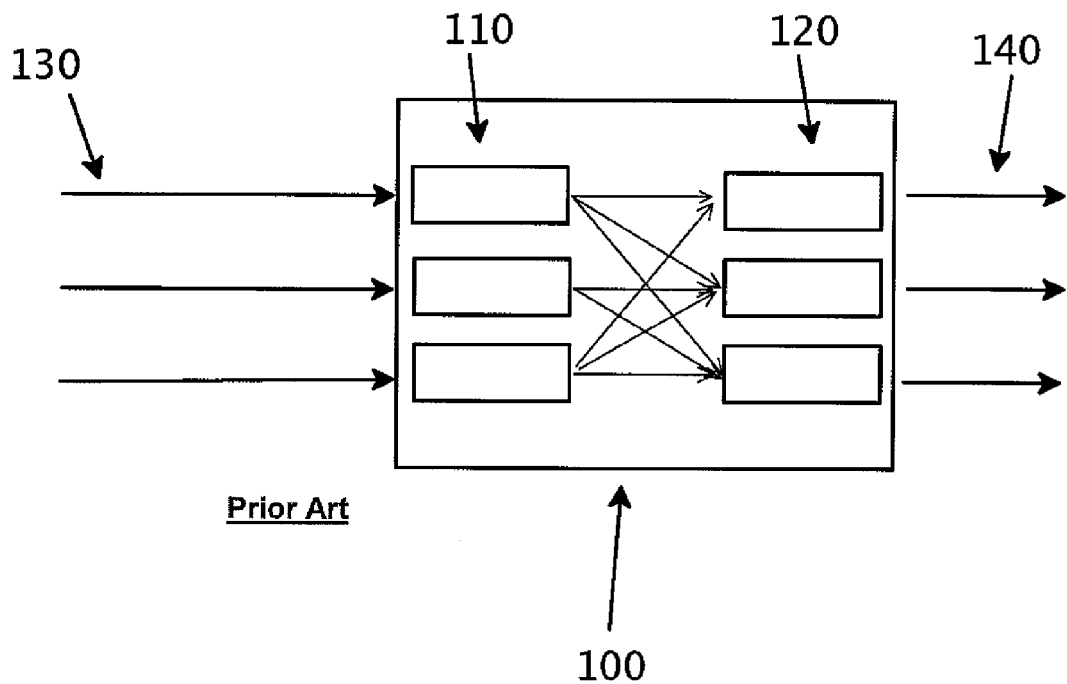
FIG. 1 is a schematic showing basic components of a network router.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Embodiments of the present invention may provide a method and system for estimating the bandwidth required to ensure a specified quality of service (QoS) for a traffic flow traversing a switch or router in a communications network. Embodiments of the invention may provide a technique for calculating a compact representation of the traffic flow that is sufficient for determining the bandwidth required by each packet in the traffic flow. The bandwidth required to maintain a quality of service for the entire flow can then be calculated as a quantile of the per-packet bandwidth requirements.

The technique may perform a calculation that is equivalent to the computationally expensive method of simulating the passage of the traffic flow through a switch and varying the simulated service rate until the QoS targets are precisely satisfied. For our purposes, the required QoS will be stated as a delay bound, d, and a tolerated fraction of packets, p, that may be delayed beyond the delay bound. For example, we may require not more than 1% of packets are delayed by more than 30 milliseconds. It will be appreciated that this is exemplary of the type of QoS target that may be used in conjunction with the methodology of embodiments of the present invention.

We now describe embodiments of the invention in the exemplary context of how they solve one specific Bandwidth Requirement (BWR) calculation, namely how to calculate the service rate at a buffer sufficient to ensure that not more than the specified fraction of packets experience a queuing delay greater than a specified delay bound. We will assume that the buffer can queue an arbitrarily large number of packets without loss, i.e. that it is not a finite buffer.

To calculate the bandwidth required to ensure an arriving packet is not delayed beyond the bound, it may be sufficient to have a function $Q(s)$ that specifies the number of bits in the buffer at the instant the packet arrives (including the arriving packet), as a function of the service rate, s. Given this function we can then find the service rate s such that all the bits in the buffer, including the arriving packet, can be served within the delay bound. That is, we may find the service rate s such that $(Q(s)/s)$ is equal to the delay bound.

A difficulty lies in calculating the function $Q(s)$, using practical memory and computation requirements. Embodiments of the present invention may overcome this difficulty.

Assuming that a buffer has unlimited capacity, and bits are removed from the buffer at a constant service rate, s, then the number of bytes waiting in the buffer at any moment may be the maximum excess of the bytes that have arrived over the bytes that have departed, where the maximum may be taken over all time intervals that end at the current time. We may denote the number of bytes that have arrived in the past t seconds as A(t), known as an 'Arrivals process'. The arrivals process can be represented graphically as in FIG. 2 (shown in FIG. 2 as the solid line 200) where the total cumulative volume that has arrived in the buffer in the past "x" seconds is defined on the "y" axis and the time may be plotted on the "x" axis. It may be assumed that the point (0, 0) represents the current moment in time. We use the convention that A(0)=b, where b is the volume of the arriving packet. The number of bytes that could have left is s times t. In one embodiment, a first representation of $Q(s)$ is:

$$Q(s) = \text{maximum value of } \{A(t) - s \cdot t\} \text{ over all values of } t. \quad (1)$$

This description of $Q(s)$ is concise, but it may be impractical in its basic form, because calculating A(t) may require the storage of information about the arrival time and size of each packet.

A key insight of embodiments of this invention is that calculation of $Q(s)$ may depend on the value of A(t) only at certain values of t as opposed to all values of t. These certain values may be those values of A(t) on the 'concave hull' of A(t), as defined below and as shown in the graphical representation of FIG. 2 as the line 210. The concave hull of A(t) may contain much less information than A(t), and for this reason it may be practical to use the concave hull to calculate the BWR.

The concave hull of A(t) can be defined as follows. The first point on the concave hull may be the time $t_1$, that maximises the value A(t)/t for all values of t. Subsequent points $t_i$ on the concave hull may be those that maximise the value of $(A(t_i) - A(t_{i-1}))/(t_i - t_{i-1})$ for all values of $t_i > t_{i-1}$ (here we are taking the convention that positive values of t represent times before the present moment). In other words, the concave hull of A(t) may be the smallest function that is always greater than or equal to A(t) and has non-increasing slope.

The value of $Q(s)$ may be calculated by taking the maximum value of $\{A(t) - s \cdot t\}$ over all values of t on the concave hull of A(t). This concave hull representation may contain far less information than the full arrivals process A(t) and therefore, if used, may greatly reduce the memory requirements and running time of a computation required to calculate $Q(s)$. Thus, it may be feasible to calculate $Q(s)$ in an online calculation. The point on the concave hull that maximises $\{A(t) - s \cdot t\}$ is significant: it may represent the last time at which the buffer was empty, if served at the service rate s.

Figure 2:
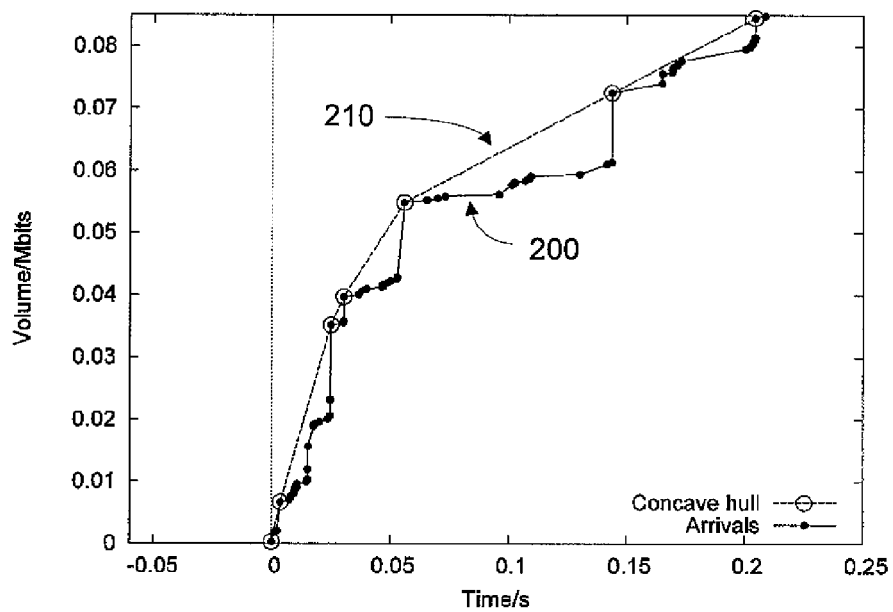
FIG. 2 shows an example, in graphical form, of a concave hull of an arrivals process, in accordance with embodiments of the present invention.

FIG. 2 shows an example, in graphical form, of a concave hull of an arrivals process, in accordance with various embodiments. The arrivals process is shown with each packet being represented by a point, adjacent points being joined by a solid line. The dashed line above the arrivals process represents the concave hull 210 of the arrivals process 200. As will be noted from an examination of the concave hull representation, it contains much fewer points than the arrivals process that it represents.

We now describe how the function $Q(s)$ may be used to calculate the bandwidth required to avoid delaying a packet by more than a specified delay bound, d. For this calculation we may assume that there is no limit on the buffering available at the switch, and that the buffer is operating in a FIFO manner (first in, first out). This assumption may be practical in many situations, as although buffers are provided having a finite size, it is rare for buffers to be filled to an overflowing situation, ie that information is lost, and as such they act as if they are of an infinite size.

The concave hull of the arrivals process A(t) may contain enough information to determine the bandwidth required to serve an arriving packet within a given delay bound. We may need to find the smallest service rate such that the arriving packet, plus the current contents of the queue, can be served within the delay bound. In other words, for a delay target d, and an arriving packet of volume b, we may need to find the smallest service rate s such that $Q(s)/s$ is less than or equal to d.

The queue length $Q(s)$ may be determined from the concave hull as described above.

To calculate the service rate required to ensure the specified QoS targets are met, we may record the BWR for each arriving packet, and then may calculate the p-quantile over these BWR values, where p is the target delay probability.

Figure 3:
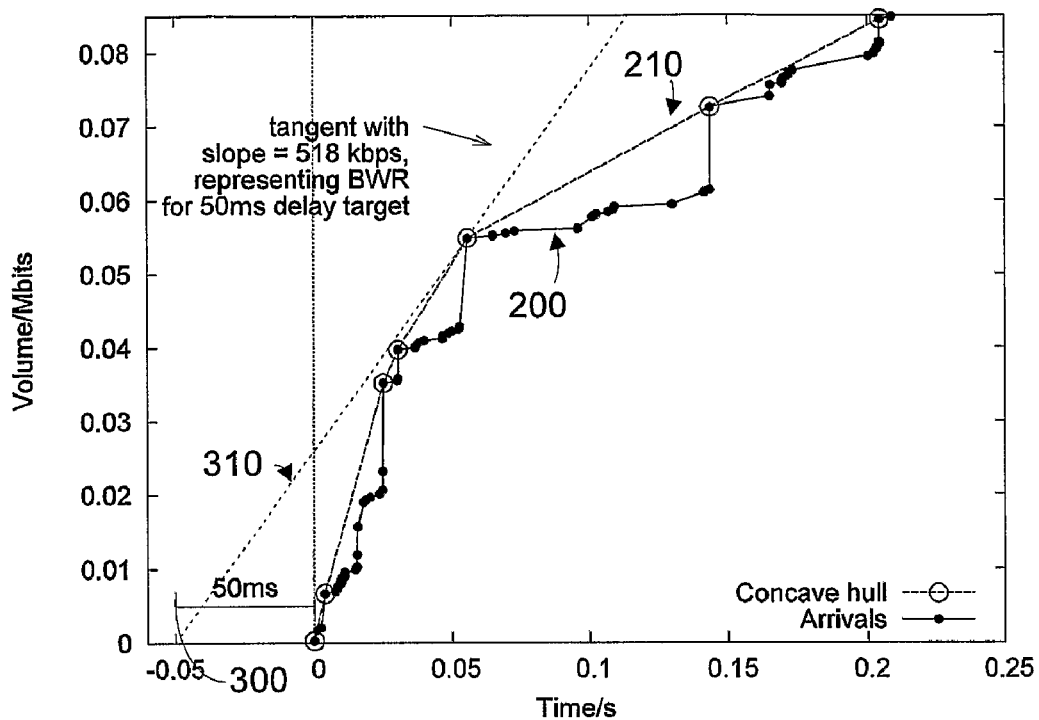
FIG. 3 shows, again in graphical form, how the concave hull of FIG. 2 may be used to generate a desired service rate for a determined delay time for a packet, in accordance with various embodiments.

As shown in FIG. 3, once a target delay (d) is determined, then that target delay represents a fixed point on the X axis of FIG. 3 (shown in FIG. 3 as a 50 ms desired delay bound 300). The delay target is illustrated on the X axis as a negative value, as conventionally it represents a time in the future, "0" on the axis being the present time situation of the buffer. By defining a line which intersects the target delay and is a tangent to the concave hull—shown as a dotted line 310—it may be possible to define a slope which is representative of the required service rate to satisfy that delay time. In this example of a delay time of 50 ms, the required service rate is 518 kps. It will be appreciated that if a different delay time was required that the tangent might be defined by a different line and might therefore have a different slope.

Figure 4:
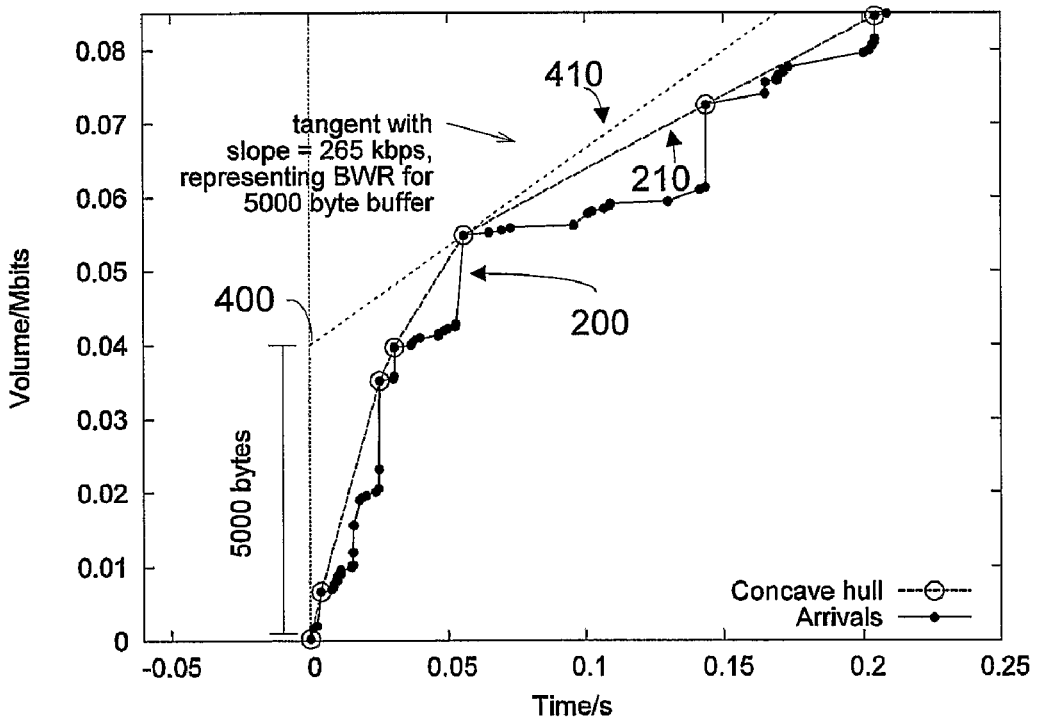
FIG. 4 shows, again in graphical form, how the buffer occupancy may be determined once a packet has been added to a queue, in accordance with various embodiments.

Similarly, as shown in FIG. 4, if the buffer occupancy in bytes is required for the instant after the packet volume has been added to the queue, then this may be provided by an intercept 400 of a tangent 410 to the concave hull 210 with the y-axis. It will be understood that this interception with the y-axis may also be used to calculate the bandwidth to ensure that the buffer occupancy never exceeds a certain defined volume threshold. In this instance, for each arriving packet it may be necessary to compute the smallest service rate such that the number of bytes in the buffer the instant after the last packet is received may be less than the desired byte threshold. In other words for a certain threshold B bytes (shown in this example as 5000 bytes, or 0.04 Mbits), we may need to find the smallest service rate s such that Q(s) is less than or equal to B. Geometrically, this may be found by defining a tangent to the concave hull that intersects with the desired B byte value (0,B) and determining the slope of that tangent—in this example 265 kbps.

Using this technique of embodiments of the present invention it may be possible to calculate the bandwidth requirement of each arriving packet within the buffer. By taking a quantile on the set of all BWR values it may be possible to calculate the bandwidth requirement to ensure that a fixed percentage, for example, 1% of packets are not delayed beyond the delay bound specified.

So far we have examined the calculation of a required service rate, given a delay target or a maximum buffer volume limit. Alternatively or in addition, the concave hull can be used to calculate the delay experienced by the arriving packet, and the buffer occupancy after the addition of that packet, for any supplied service rate. In this case, it may be necessary to form the tangent to the concave hull with slope equal to the supplied service rate. The intersection of this tangent with the x-axis may yield the delay achieved by the arriving packet; the intersection of this tangent with the y-axis may yield the buffered volume after the arrival of the arriving packet. Such calculation may allow the generation of statistics estimating the quality of service that could be achieved for the traffic under a variety of different service rates.

Figure 5:
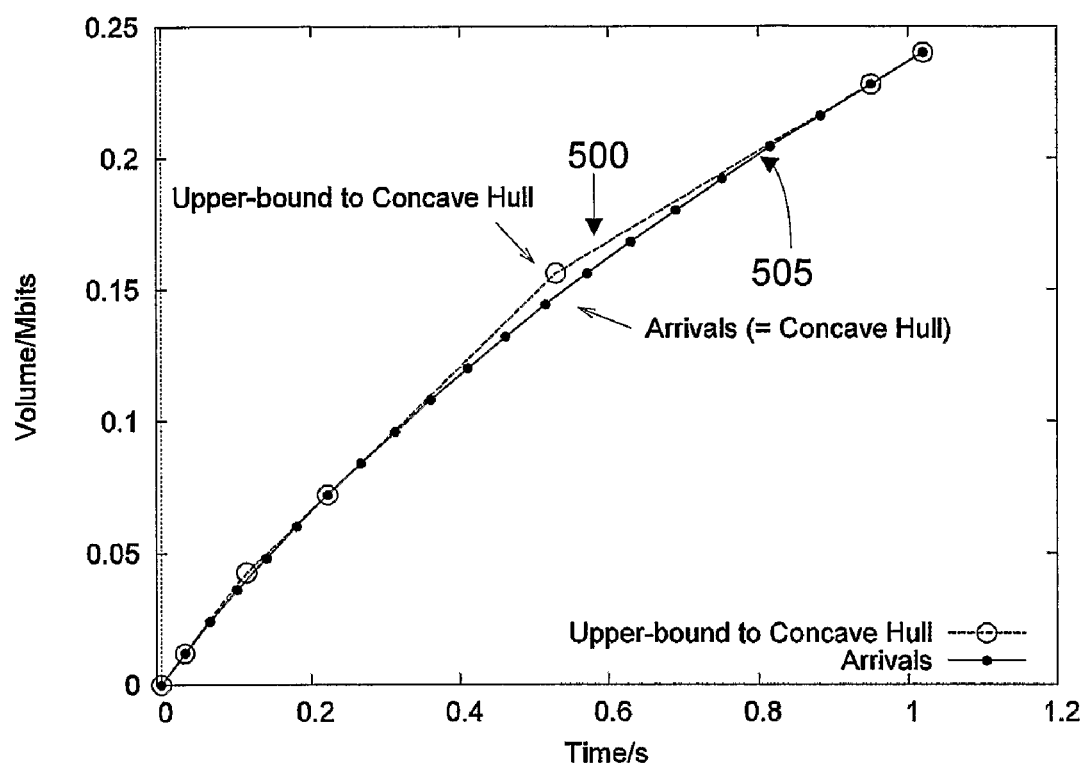
FIG. 5 shows how the number of points used to represent the concave hull may be reduced, if required, with some sacrifice of accuracy, in accordance with various embodiments.

It will be appreciated that, in practice, the number of concave hull points may tend to be very small (of the order of a dozen for a 5 minute memory, for example). However, it may be easy to find traffic patterns that require more points. For example, if all packets are of equal size, and the time between packets is very gradually decreasing, then every packet arrival may require a concave hull point. Although this may be an artificial example, in general it may be necessary to limit the number of points on the concave hull. It may be possible to impose a certain granularity on the concave hull, for example by ensuring that the slope of successive concave hull segments varies by more than some minimum amount. FIG. 5 shows this situation: a small loss in accuracy in the representation of the concave hull reduces the number of points required from 21 to 7, with the resultant stored concave hull 500 being above the actual true concave hull 505. These and other modifications will be appreciated by those skilled in the art.

The benefits of embodiments of the invention are many and include the following summarised below.

Unlike the traffic modelling and sCGF methods of the prior art, embodiments of the invention may provide an exact empirical calculation of the bandwidth required to achieve specified probabilistic quality of service targets.

Unlike the traffic modelling and sCGF methods of the prior art, embodiments of the invention make no assumptions about the statistics of the traffic. Unlike the queue simulation technique of the prior art, embodiments of the invention do not require the storage of information about every packet that has arrived. Thus, the memory and computational overhead may be vastly reduced, making the calculation practical for online measurement.

As described, the calculation of the concave hull may use the arrival time and volume of each packet. This calculation may become infeasible as the rate of packet arrivals increases. In such cases, an approximate calculation might nevertheless be sufficient for practical applications and could be carried out by regular or irregular sampling of the number and volume of arriving packets.

The method of embodiments of the present invention may provide for a calculation of the BWR required to satisfy QoS targets specified as a delay bound and a delay probability. The concave hull may also be used to calculate the probability of the volume of queued bytes exceeding a particular threshold.

As described above, the method of embodiments of the present invention may provide for a calculation of the bandwidth required to satisfy a particular QoS target. By performing the calculation for a range of probabilistic QoS targets (i.e. for a range of delay targets and a range of delay probabilities) a compact traffic descriptor for the traffic could be calculated. Such a traffic descriptor might be suitable for archiving in a database and use for capacity planning calculations.

It will be appreciated that heretofore the methodology of embodiments of the present invention may be based on certain assumptions including that the buffer has an infinite buffering capacity. Although, as mentioned above, such an approximation may be permissible for most scenarios in that although buffers are provided of finite capacity usually the buffer is served at a rate sufficient to ensure that it never overflows and therefore it appears as if it is a buffer of infinite volume. However the methodology of embodiments of the present invention may be extended for situations where the buffer is of a finite size and has finite buffering capacity. To cater for this example, embodiments of the present invention may provide for the determination of a convex hull between every two concave hull points. This then can be used to calculate approximate BWR values in the case of finite buffering capacity, i.e. for buffers that can store a finite number of packets or a finite number of bytes. Such a calculation could determine the service rate required to ensure that not more than a specified fraction of packets were lost due to insufficient buffering resources. A convex hull can be described in a similar manner to that of the concave hull above in that the convex hull of A(t) is the largest function that is always less than or equal to A(t) and has non-decreasing slope.

A key idea, in such an embodiment, is that every buffer overflow and buffer emptying may be a renewal event, in the sense that the buffer 'forgets' the arrivals process before that point. Hence, even though the arrivals process A(t) may not directly contain information about packet loss, and hence may become less and less accurate for older values, it may tell us about recent history.

Consider the following two service rates:

1. $C_V$, the maximum service rate such that the queue now contains not less than certain number of bytes. This rate may be calculated using the concave hull, as described already.

2. $C_X(t)$, the maximum service rate such that the queue length just before a packet arrives is the largest that it has been in the last t seconds. This rate can be calculated given the convex hull of the arrivals process for the last t seconds. $C_X(t)$ may be of relevance in the finite buffer case: if $C_X(t)$ is less than $C_V$, where t is the time associated with the concave hull point $C_V$, then condition 2 above may ensure that if we serve the queue at rate $C_X(t)$, the queue length may now be less than its maximum value. If the queue can only contain a maximum of B bytes, and $C_V$ would ensure that a queue of infinite capacity would currently contain B bytes, we can conclude that the finite queue, served at rate $C_X$, has overflowed within the last t seconds, and can no longer be full, making $C_X$ a sufficient rate.

We introduce a little notation before sketching a technique that may be used in accordance with embodiments of the present invention to address the problem of finite byte buffers:

$A(t)$ is, as described above, the Arrivals process, being the volume that has arrived in the last t seconds. Unless otherwise specified, $A(t)$ may include the current packet volume {that is, $A(0)=b$, where b is the volume of the arriving packet}.

$V_i$ is the time interval from the origin to the moment at which the i-th concave hull point arrived. The concave hull point may be a (time, volume) pair $(V_i; A(V_i))$.

$X_{ij}$ the j-th point on the convex hull of the arrivals process from the origin to time $V_i$. That is, we may calculate a convex hull between the origin to each concave hull point.

Figure 6:
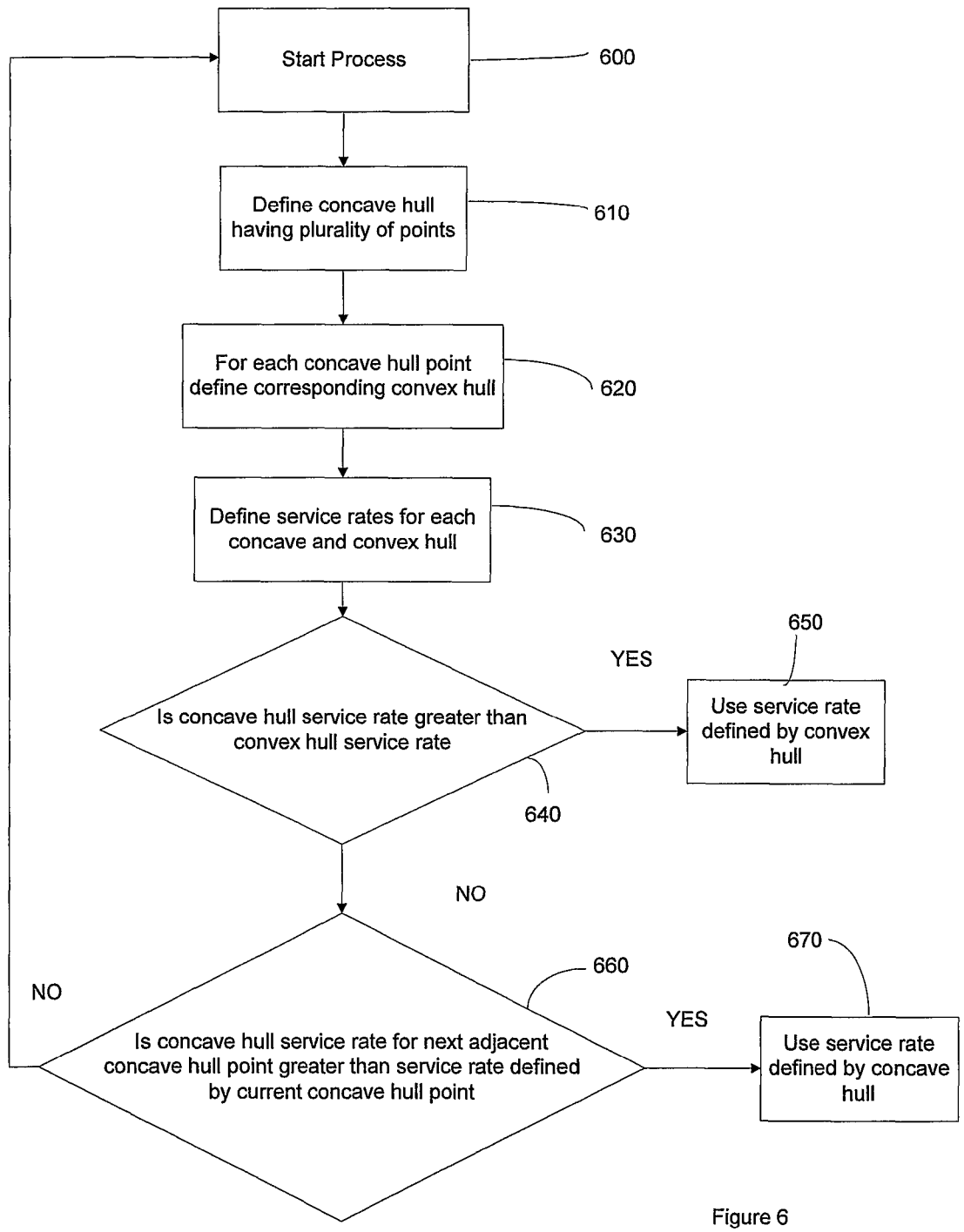
FIG. 6 shows how embodiments of the present invention may be adapted to accommodate for a finite buffer.

The approximate bandwidth required to accommodate an arriving packet of b bytes in a byte buffer of capacity B bytes can be calculated as follows (the procedure is shown diagrammatically in FIG. 6):

| | |
|---|---|
| Define Concave Hull | (610) |
| Define Convex Hulls | (620) |
| i ← 0 | |
| Repeat | |
| i ← i+1 | |
| $C_v$ ← $(A(V_i)-B)/V_i$ {BWR for i-th concave hull point} | (630) |
| $C_x$ ← $\min_j (A(X_{ij})-b)/X_{ij}$ {rate tangent to convex hull} | (630) |
| Until | |
| $C_x < C_v$ or | (640) |
| $C_V > (A(V_{i+1})-B)/V_{i+1}$ | (660) |
| Use/Output BWR := min $(C_X, C_V)$ | (650/670) |

In other words, the process may start (block 600) and a concave hull for the arrivals process may initially be defined (block 610). For each concave hull point, a convex hull may be defined (block 620). The current point may be set to the next concave hull point (i.e. initially set to the most recent concave hull point). The service rates defined (block 630) by both the concave hull and the corresponding convex hull may, in general, be different as $C_V$ is the service rate at which the queue length in an infinite buffer would now be exactly B bytes and $C_X$ represents the smallest service rate for which the queue length (at the moment before the current packet arrives) may not be the maximum seen since the time associated with the concave hull point $C_V$. The 'until' line in the algorithm may terminate initially if the convex hull rate is lower than concave hull BWR (block 640). In such a situation, the service rate defined by the convex hull may be used (block 650). If however the concave hull service rate is less than the convex hull service rate, then the service rate for the next adjacent concave hull point may be compared with the service rate defined by the current concave hull service rate (block 660). If the service rate defined by the next concave hull service rate is less than that defined by the current concave hull service point, ie the max concave hull BWR is determined, the algorithm may terminate and may output the max concave hull BWR (block 670). If neither of these termination conditions is fulfilled, the algorithm may continue, considering the next convex hull.

Figure 7:
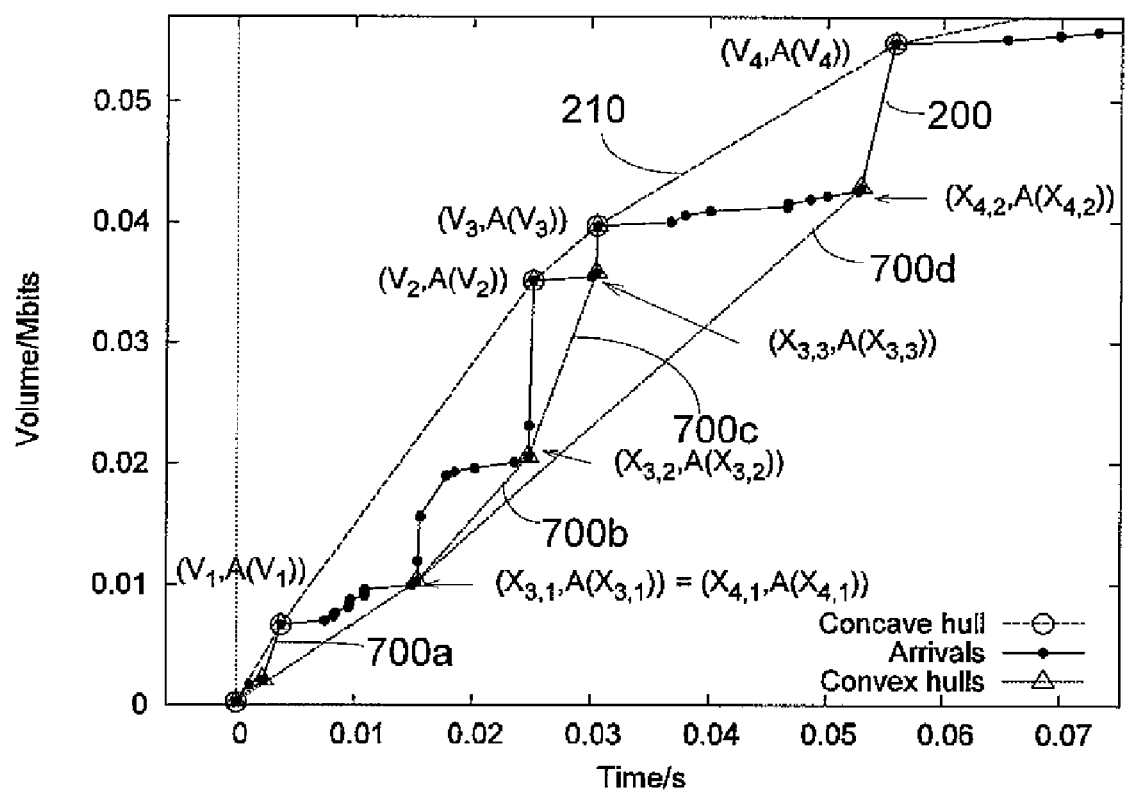
FIG. 7 shows graphically how embodiments of the present invention may be adapted to accommodate for finite buffer restrictions.

It will be appreciated that the rates $C_x$ and $C_V$ provide upper and lower bounds on the bandwidth requirement, and can be made more of a conservative estimate of the requirement by using average values of these two parameters as opposed to the minimum values for the BWR. Similarly, if underestimation is more of a problem than overestimation, then it might be worth using $C_V$ as the BWR (but still using the convex hull to determine a stopping criterion). A graphical representation of the notation introduced above is shown in FIG. 7, in accordance with various embodiments. Although FIG. 7 illustrates the creation of convex hulls between the origin and adjacent concave hull points (700a, 700b, 700c, 700d), the technique of embodiments of the present invention may be adapted to create successive convex hulls between adjacent concave hull points as opposed to between the origin and successive concave hull points. Such a technique may be preferable in the scenario where a dynamic iteration of the determination of the concave and convex hulls is required. In such an example, the definition of the convex hulls between successive concave hull points may be more efficient for both processing and storage purposes, as it may not be necessary to re-calculate each convex hull each time additional data is added to the buffer.

Figure 8:
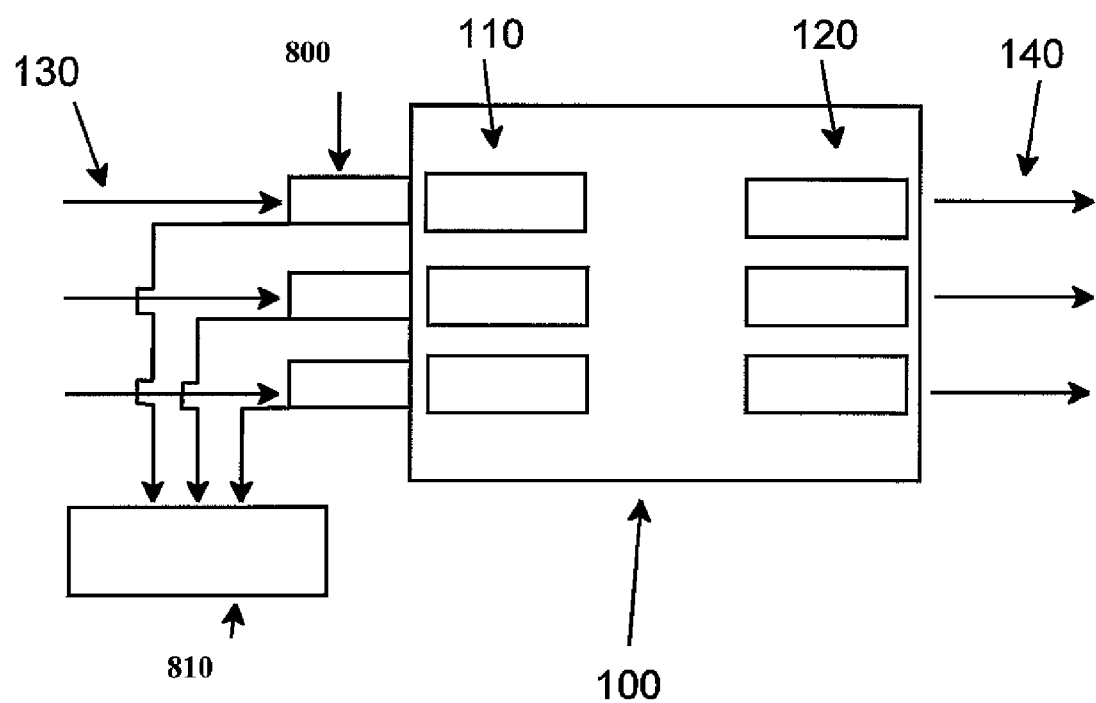
FIG. 8 is a schematic representation of system components used in an implementation embodiments of the present invention.

While the basic block components of a router have been shown in FIG. 1, and the actual physical representation of links to and from a router or any similar network component such as servers and the like will be understood by the person skilled in the art, FIG. 8 shows additional components of such router architecture, in accordance with various embodiments, which are useful in implementations of embodiments of the present invention. The same reference numerals will be used for similar components. As before, the portion of the network that we are interested in may be that portion of the network associated with the router 100, which may be provided with one or more output links 140 and a plurality of input multiplex links 130. Each of the input links may be coupled through a traffic volume counter 800, which may be coupled to a Bandwidth Requirement Calculation (BWR) module 810. The volume counters 800 and in particular the BWR module 810 may contain the majority of the various means, both software and hardware components, for carrying out embodiments of the invention. The means may, as will be appreciated by the person skilled in the art, include suitable hardware components such as integrated circuits, memory and the like all of which can be suitably provided with software necessary to effect the methodology of embodiments of the present invention.

It will be appreciated that heretofore the technique of embodiments of the present invention has been with reference to the example of a buffer being populated with individual bits. However, in packet buffered queues, the queue capacity may be measured in packets, rather than bytes. The technique of embodiments of the present invention may be adapted from a byte-buffer loss algorithm to packet buffer, by assuming that the packets remaining in the buffer are an unbroken sequence of recently arrived packets. Under this assumption, the condition that an arriving packet can be accommodated in a packet buffer of N slots may be equivalent to the condition that the byte-occupancy is not more than the volume in the N−1 most recent packets. In this way, the finite byte-buffer algorithm can easily be used to approximate the packet-buffer BWR. In the algorithm, simply replace the buffer capacity B with B(N−1), the sum of bytes in the most recent N packets (not including the currently arriving packet). It will be noted that packet buffering may have no impact on the delay-bound BWR calculation.

Although embodiments of the invention have been described with reference to the analysis of traffic entering a buffer it will be appreciated that this is exemplary of the application of the techniques of embodiments of the present invention as it is not necessary for only buffered data to be analysed. For example, the methodology of embodiments of the present invention can be used in a traffic analysing tool placed at any node or location in a data network and used to monitor the passing of traffic past that node. In such an implementation, the traffic analysing tool may simply require notification of the size and time of arrival of each packet of interest. It will be appreciated that additional features may be incorporated, such as filters to select a subset or subsets of interest from the complete set of packets, for example. The monitored traffic can then simply be analysed using the concave hull determination techniques outlined above.

Similarly the output of the analysis of the monitored traffic can be used for a plurality of different purposes for example:

in weighted scheduler arrangements to determine the optimum weights to assign to each buffer, or as a parameter to describe traffic in a network. Such a traffic descriptor could for example include a relationship between the service rate and quality of service achieved at that service rate.

As will be appreciated by those skilled in the art, a plurality of traffic analysers according to embodiments of the invention can be implemented across a data network and used to create an analysis of traffic across the entire network. Similarly, rules can be applied such that different types of data for example Voice Data, Internet Traffic etc., can be analysed using the technique of embodiments of the present invention and then treated differently depending on the output of the analysis.

It will be appreciated therefore that the techniques of embodiments of the present invention may by modified in a number of differing fashions depending on the applications and level of accuracy required in the calculation. In embodiments however, the methodology of embodiments of the present invention may utilise the concept of the concave hull as a means to minimize the size of the data set that needs to be analysed in order to determine a satisfactory reflection of the activity within a packet.

It will be appreciated that although the concave and convex hulls and their use has been described with reference to graphical representations of these that it is not a requirement of embodiments of the present invention to provide an actual graphical depiction of an arrivals process, a hull to that process, or tangents to that hull, in order to implement embodiments of the present invention. As will be understood by those skilled in the art, many such calculations may be conducted on the raw collected data that is storable in one or more data stores provided by embodiments of the present invention without requiring any graphical user interface representation. As such where embodiments of the present invention are described with reference to graphical representations, it will be appreciated that these graphical representations are purely for ease of understanding and are not intended to limit the embodiments of present invention to these graphical representations.

The words comprises/comprising when used in this specification are to specify the presence of stated features, integers, operations or components but does not preclude the presence or addition of one or more other features, integers, operations, components or groups thereof.

The invention claimed is:

1. A method of analysing traffic at least one node in a packet data network, the method comprising:

monitoring the volume of traffic passing the node over time so as to determine an arrivals process for that node, generating a concave hull function representative of the arrivals process from the determined arrivals process, the concave hull function defining a first data set, the concave hull function being dynamically updated by the iterative arrival of traffic passing the node, and using the concave hull function in an analysis of the traffic, wherein the node is a buffer in the network, the first data set is used to calculate the delay experienced by packets traversing the buffer for a supplied service rate, the service rate determining the rate at which traffic arriving in the buffer is to be removed from the buffer, the supplied service rate is represented as a tangent to the concave hull of the arrivals, and the delay experienced by the arriving packet is defined by the point of intersection of the tangent with the x-axis.

2. The method as claimed in claim 1 wherein the buffer is provided having a finite size and the traffic defining the arrivals process is such so as to overflow that finite size buffer, the method including:

using the determined arrivals process to define a second data set, the second data set being a set of convex hull functions representative of the arrivals process from the current time to each concave hull point, and using a combination of the first data set and second data set as an analysis of the traffic.

3. The method as claimed in claim 2 further including using the first data set to calculate the service rate required to ensure that the buffered volume is no more than a supplied volume after the arrival of a packet, so as to determine a minimum service rate sufficient to ensure the buffered volume does not exceed a maximum allowed volume, and using the second data set to define a maximum service rate such that the buffered volume at the current time is larger than at any other time since the time represented by a particular concave hull point.

4. The method as claimed in claim 3 wherein the use of the combination of the first and second data set includes a comparison of service rates for both the first and second data sets, the method including the additional step of selecting the lesser of the two service rates as the service rate for servicing the traffic at the node, this lesser service rate being sufficient to ensure that the arriving packet is not lost.

5. The method as claimed in claim 3 including the additional step of equating a maximum allowed buffered volume to an equivalent maximum allowed number of packets, the equating being effected by determining an average number of bytes in each packet.

6. The method as claimed in claim 3 including the additional step of equating a maximum allowed buffered volume to an equivalent maximum allowed number of packets, the equating being effected by performing an exact mapping for a determined number of packets to the volume occupied by those packets.

7. The method as claimed in claim 2 wherein a plurality of convex hulls are defined for the arrivals process, each of the convex hulls being provided between adjacent points on the concave hull of the arrivals process.

8. A method of analysing traffic at least one node in a packet data network, the method comprising:
monitoring the volume of traffic passing the node over time so as to determine an arrivals process for that node,
generating a concave hull function representative of the arrivals process from the determined arrivals process, the concave hull function defining a first data set, the concave hull function being dynamically updated by the iterative arrival of traffic passing the node, and
using the concave hull function in an analysis of the traffic, wherein the node is a buffer in the network, the first data set is used to calculate the volume of queued bytes in the buffer after the arrival of a packet, for a supplied service rate, the supplied service rate is represented as a tangent to the concave hull of the arrivals, and the volume of queued bytes in the buffer after the arrival of a packet is defined by the point of intersection of the tangent with the y-axis.

9. The method as claimed in claim 8 wherein the buffer is provided having a finite size and the traffic defining the arrivals process is such so as to overflow that finite size buffer, the method including:
using the determined arrivals process to define a second data set, the second data set being a set of convex hull functions representative of the arrivals process from the current time to each concave hull point, and
using a combination of the first data set and second data set as an analysis of the traffic.

10. The method as claimed in claim 9 further including using the first data set to calculate the service rate required to ensure that the buffered volume is no more than a supplied volume after the arrival of a packet, so as to determine a minimum service rate sufficient to ensure the buffered volume does not exceed a maximum allowed volume, and using the second data set to define a maximum service rate such that the buffered volume at the current time is larger than at any other time since the time represented by a particular concave hull point.

11. The method as claimed in claim 10 wherein the use of the combination of the first and second data set includes a comparison of service rates for both the first and second data sets, the method including the additional step of selecting the lesser of the two service rates as the service rate for servicing the traffic at the node, this lesser service rate being sufficient to ensure that the arriving packet is not lost.

12. The method as claimed in claim 10 including the additional step of equating a maximum allowed buffered volume to an equivalent maximum allowed number of packets, the equating being effected by determining an average number of bytes in each packet.

13. The method as claimed in claim 10 including the additional step of equating a maximum allowed buffered volume to an equivalent maximum allowed number of packets, the equating being effected by performing an exact mapping for a determined number of packets to the volume occupied by those packets.

14. The method as claimed in claim 9 wherein a plurality of convex hulls are defined for the arrivals process, each of the convex hulls being provided between adjacent points on the concave hull of the arrivals process.

15. A method of analysing traffic at least one node in a packet data network, the method comprising:
monitoring the volume of traffic passing the node over time so as to determine an arrivals process for that node,
generating a concave hull function representative of the arrivals process from the determined arrivals process, the concave hull function defining a first data set, the concave hull function being dynamically updated by the iterative arrival of traffic passing the node, and
using the concave hull function in an analysis of the traffic, wherein the node is a buffer in the network, the first data set is used to calculate the service rate required to ensure an arriving packet at the node is delayed by no more than a supplied delay, the supplied delay is represented as a point on the x-axis and the required service rate is defined as the tangent to the concave hull of the arrivals that passes through that point on the x-axis.

16. The method as claimed in claim 15 wherein the buffer is provided having a finite size and the traffic defining the arrivals process is such so as to overflow that finite size buffer, the method including:
using the determined arrivals process to define a second data set, the second data set being a set of convex hull functions representative of the arrivals process from the current time to each concave hull point, and
using a combination of the first data set and second data set as an analysis of the traffic.

17. The method as claimed in claim 16 further including using the first data set to calculate the service rate required to ensure that the buffered volume is no more than a supplied volume after the arrival of a packet, so as to determine a minimum service rate sufficient to ensure the buffered volume does not exceed a maximum allowed volume, and using the second data set to define a maximum service rate such that the buffered volume at the current time is larger than at any other time since the time represented by a particular concave hull point.

18. The method as claimed in claim 17 wherein the use of the combination of the first and second data set includes a comparison of service rates for both the first and second data sets, the method including the additional step of selecting the lesser of the two service rates as the service rate for servicing the traffic at the node, this lesser service rate being sufficient to ensure that the arriving packet is not lost.

19. The method as claimed in claim 17 including the additional step of equating a maximum allowed buffered volume to an equivalent maximum allowed number of packets, the equating being effected by determining an average number of bytes in each packet.

20. The method as claimed in claim 17 including the additional step of equating a maximum allowed buffered volume to an equivalent maximum allowed number of packets, the equating being effected by performing an exact mapping for a determined number of packets to the volume occupied by those packets.

21. The method as claimed in claim 16 wherein a plurality of convex hulls are defined for the arrivals process, each of the convex hulls being provided between adjacent points on the concave hull of the arrivals process.

22. A method of analysing traffic at least one node in a packet data network, the method comprising:
monitoring the volume of traffic passing the node over time so as to determine an arrivals process for that node,
generating a concave hull function representative of the arrivals process from the determined arrivals process, the concave hull function defining a first data set, the concave hull function being dynamically updated by the iterative arrival of traffic passing the node, and
using the concave hull function in an analysis of the traffic, wherein the node is a buffer in the network, the first data set is used to calculate the service rate required to ensure that the buffered volume is no more than a supplied volume after the arrival of a packet, the supplied volume is represented as a point on the y-axis and the required service rate is defined as the tangent to the concave hull of the arrivals that passes through that point on the y-axis.

23. The method as claimed in claim 22 wherein the buffer is provided having a finite size and the traffic defining the arrivals process is such so as to overflow that finite size buffer, the method including:
using the determined arrivals process to define a second data set, the second data set being a set of convex hull functions representative of the arrivals process from the current time to each concave hull point, and
using a combination of the first data set and second data set as an analysis of the traffic.

24. The method as claimed in claim 23 further including using the first data set to calculate the service rate required to ensure that the buffered volume is no more than a supplied volume after the arrival of a packet, so as to determine a minimum service rate sufficient to ensure the buffered volume does not exceed a maximum allowed volume, and using the second data set to define a maximum service rate such that the buffered volume at the current time is larger than at any other time since the time represented by a particular concave hull point.

25. The method as claimed in claim 24 wherein the use of the combination of the first and second data set includes a comparison of service rates for both the first and second data sets, the method including the additional step of selecting the lesser of the two service rates as the service rate for servicing the traffic at the node, this lesser service rate being sufficient to ensure that the arriving packet is not lost.

26. The method as claimed in claim 24 including the additional step of equating a maximum allowed buffered volume to an equivalent maximum allowed number of packets, the equating being effected by determining an average number of bytes in each packet.

27. The method as claimed in claim 24 including the additional step of equating a maximum allowed buffered volume to an equivalent maximum allowed number of packets, the equating being effected by performing an exact mapping for a determined number of packets to the volume occupied by those packets.

28. The method as claimed in claim 23 wherein a plurality of convex hulls are defined for the arrivals process, each of the convex hulls being provided between adjacent points on the concave hull of the arrivals process.

29. A method of analysing traffic at least one node in a packet data network, the method comprising:
monitoring the volume of traffic passing the node over time so as to determine an arrivals process for that node,
generating a concave hull function representative of the arrivals process from the determined arrivals process, the concave hull function defining a first data set, the concave hull function being dynamically updated by the iterative arrival of traffic passing the node, and
using the concave hull function in an analysis of the traffic, wherein the node is a buffer in the network, and a tangent to the concave hull of the arrivals is used to calculate a service rate for servicing the traffic at the node.

30. A traffic analyser for use in analysing traffic passing a buffer node in a packet data network, the analyser including:
a volume monitor, the volume monitor being adapted to monitor the volume of traffic passing the node over time;
a processor adapted to process the arrivals process so as to define a concave hull function representative of the arrivals process; the concave hull function defining a first data set, the concave hull function being dynamically updated by the iterative arrival of traffic passing the node, the processor being configured to use a tangent to the concave hull of the arrivals to calculate a service rate for servicing the traffic at the node.

* * * * *